United States Patent [19]
Catalano et al.

[11] 3,733,119
[45] May 15, 1973

[54] AUDIO-VISUAL SYSTEM

[75] Inventors: Paul D. Catalano, Manhasset; Norman Buten, Douglaston, both of N.Y.; George H. Eash, Encino, Calif.; Frank V. Emanuel, Cherry Hill, N.J.

[73] Assignee: Retention Communication Systems, Inc., New York, N.Y.

[22] Filed: Dec. 14, 1970

[21] Appl. No.: 97,794

[52] U.S. Cl. ............................................. 352/78 R
[51] Int. Cl. ............................................. G03b 21/00
[58] Field of Search .................... 352/72, 78 R, 78 C; 95/31 CA

[56] References Cited

UNITED STATES PATENTS

| 3,126,163 | 3/1964 | Knox | 352/78 UX |
|---|---|---|---|
| 3,305,296 | 2/1967 | Nicosia | 352/78 X |
| 3,612,673 | 10/1971 | Skiya | 352/78 X |
| 3,498,703 | 3/1970 | Gerry | 352/72 X |

*Primary Examiner*—John M. Horan
*Assistant Examiner*—Michael L. Gellner
*Attorney*—Kane, Dalsimer, Kane, Sullivan & Kurucz

[57] ABSTRACT

An audio-visual system including a cartridge and an audio-visual housing. The cartridge contains an endless tape on one reel and an endless filmstrip in a loop. Means are also provided on the cartridge to bring the continuous tape and continuous filmstrip into communication with openings to the exterior of the cartridge. The audio-visual housing is adapted to receive the cartridge and start means on the housing are provided responsive to reception of a portion of the cartridge within the housing to activate a tape drive motor, a lamp and a power source. Tape engaging and audio pick-up means are in the housing to engage the exposed portion of the tape when the cartridge is received in the housing and is responsive to the tape drive motor to drive the continuous tape. Audio means are in the housing in communication with the pick-up head means to transmit the sound tracks from the tape. Discriminator means are positioned in the housing in communication with the pick-up head to receive and respond to a signal received from the tape. Film transport means are also in the housing to engage the exposed portion of the filmstrip when the cartridge is received in the housing and is adapted to transport the film. Film advance means is positioned in the housing and is in communication with the discriminator means and the film transport means so that when a signal is received by the discriminator means it will respond by causing the film advance means to drive the film transport means and transport the film to thereby permit the tape and film to be advanced in a predetermined sequence. A projector lens is located in the housing and is aligned with the exposed portion of the film and the cartridge positioned in the housing. Condenser and director means are in the housing and the cartridge positioned in the housing and is in association with the lamp to condense and direct light from the lamp onto the rear of the film and to pass through the film and aligned lens and thereby project an image of the exposed frame of film. Finally, cooling means is positioned in the housing to assist in preventing excessive heating of the exposed filmstrip and the interior of the housing.

1 Claim, 19 Drawing Figures

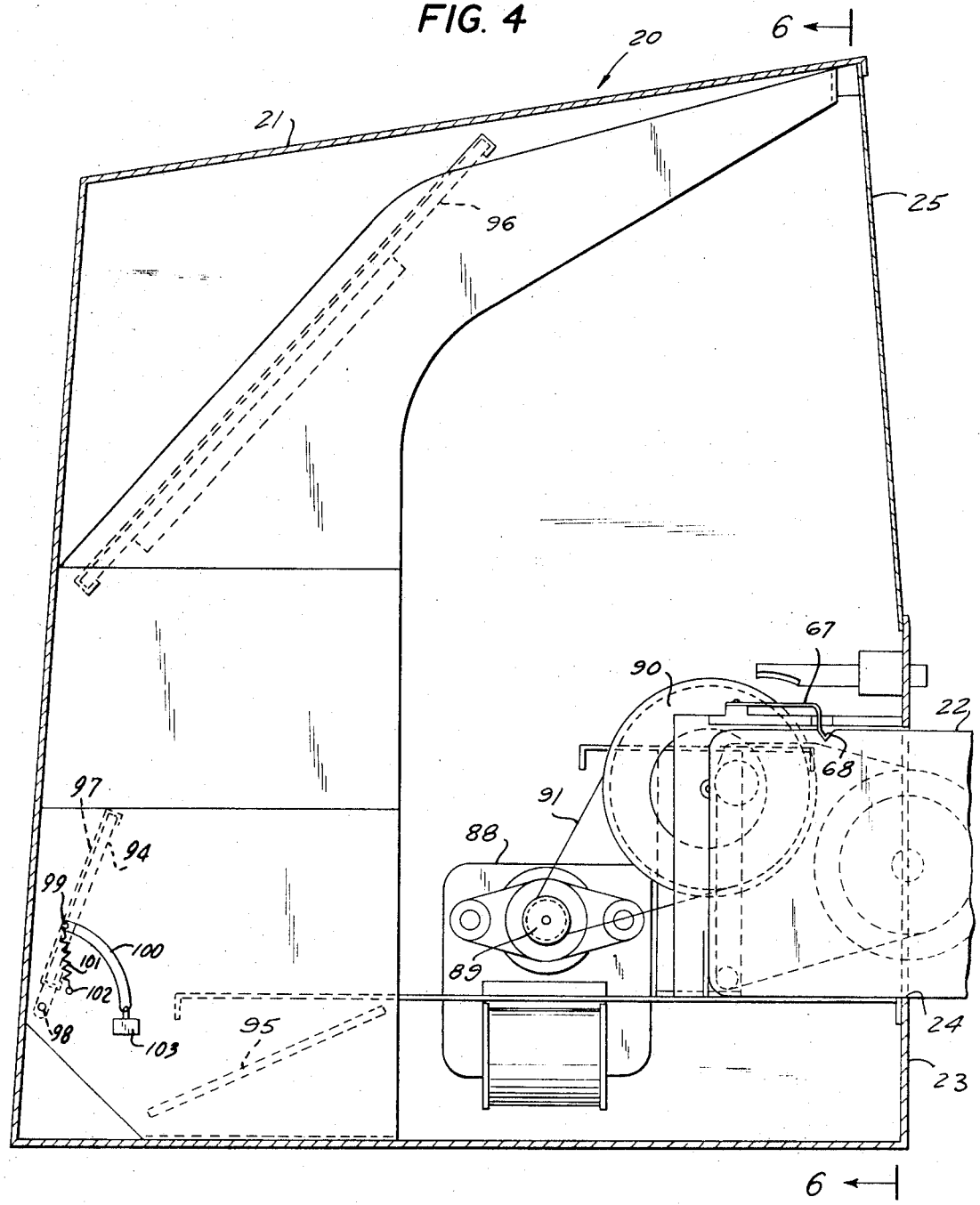

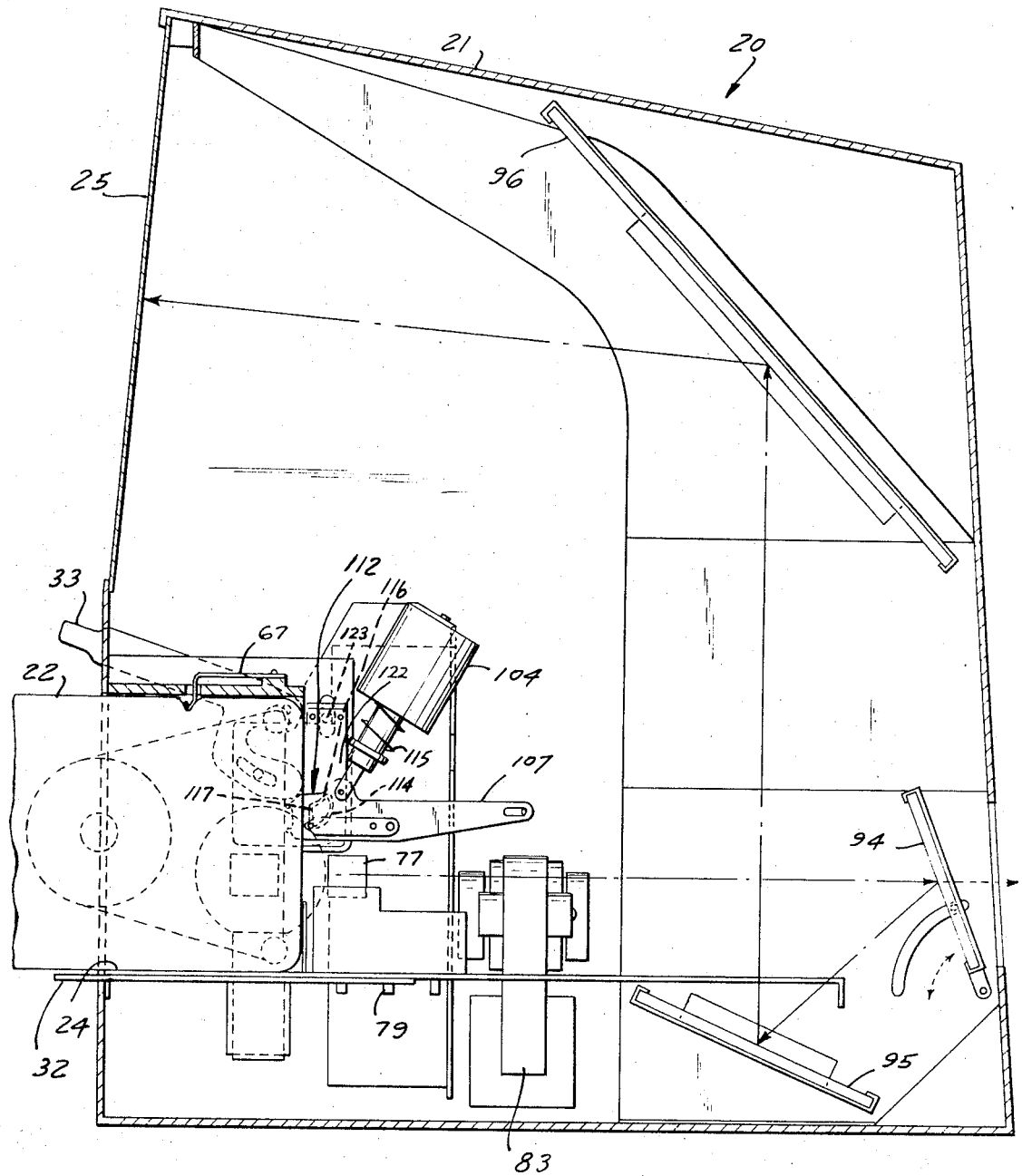

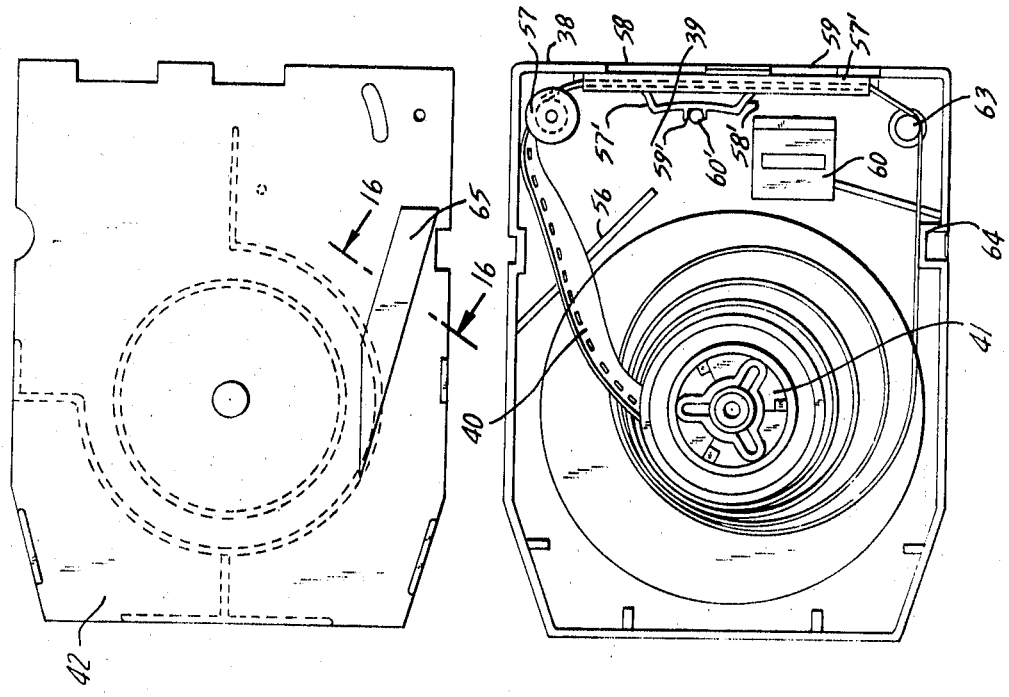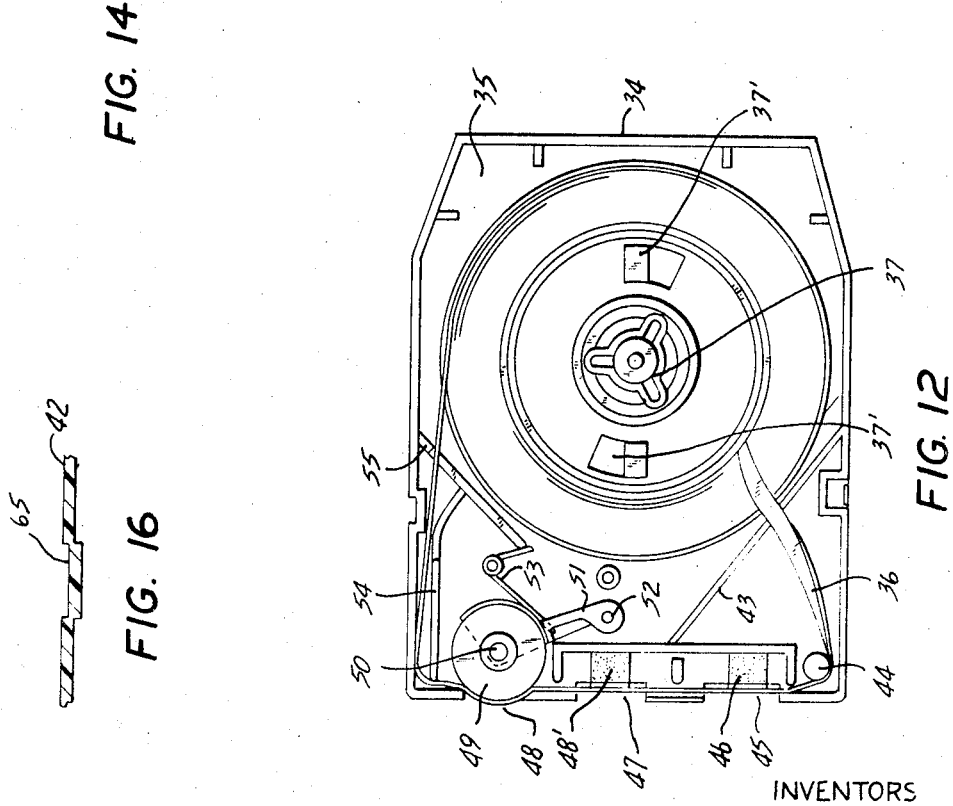

AUDIO-VISUAL SYSTEM

BACKGROUND OF THE INVENTION

There is an area in today's communication field which warrants the necessity of the development of a communications system which utilizes the effective joining of pictorial information, audio program and projection thereof creating new and intimate contact with the mind of the viewer. With this type of system, an adult is able to fill the void between the local movie house and the television set. For a child the void is filled between school and textbook at home. Additionally, for business and industry this type of system fills the void between sophisticated live presentation and worthy training manuals.

A two-component arrangements makes this system possible. A cartridge component is utilized which contains both the picture and the sound and an automatic audio-visual projector is employed to cooperate with the cartridge and project the picture and sound in sequence.

The existing audio-visual projector range includes the 35 millimeter, 16 millimeter, 8 millimeter and Super 8 millimeter film. In addition, many libraries of audio-visual programs and materials made by hundreds of producers, writers and educators are also in existence. Each film format requires a different size and type projector. Most of the projectors are expensive, complicated and cumbersome to use creating problems that greatly inhibit the sale and use of audio-visual materials in schools and industry. Until the present, there has been no single standard for program or projector. It would be extremely advantageous in the audio-visual field to provide such a standard. A system which makes possible the conversion of vast and multifarious libraries into one inexpensive and easy to use cartridge system would be extremely desirable.

It would also be advantageous if a system of this type can be adapted to convert a library of any size and nature into the system. This means that school books, training manuals, films, tapes and records now in existence for all levels of society, from pre-school through all grades, business training and selling, government and military training, medical information, home entertainment can be included in the system. In short, every area where information should be communicated and retained would be available in one easy to utilize format.

Furthermore, the system should be more efficient, effective and economical than any other communication method in existence.

SUMMARY OF THE INVENTION

Among the objectives of the invention is to provide a system which will accomplish the above discussed needs in the art. Furthermore, the overall system envisions the use of a cartridge and audio-visual housing or projector in cooperative arrangement. The cartridge is adapted to use Super 8 millimeter film and magnetic tape thereby providing a small audio-visual cartridge with a large programming capacity. There is a considerable saving in cost in regard to the programmed cartridge as well as in the equipment cost. In addition, a compact and lightweight audio-visual projector and cartridge system is provided. Furthermore, the system is adaptable to perform all functions of an automatic audio-visual system as well as those of a programmed instruction system with provision for student response. The system may be utilized with or without an instructor, for individual or group instruction, for a small audience by means of the use of a rear screen projection on the audio-visual housing itself, and for large audience by means of front projection from the housing onto a wall of the screen. Furthermore, the system is adapted for use in office, display, classroom, library, training center, or home.

The system is of low cost construction, is automatically operated, and includes an audio-visual projector and a unit combining sound and picture in a single small cartridge. The audio-visual projector or housing is small and easily portable, has a self-contained rear screen, and direct front screen projection capability for large group presentation. A small, low cost cartridge is utilized containing both four track magnetic sound tape and Super 8 millimeter film, other tape and film arrangements are contemplated. The cartridge has a large film and tape capacity holding up to 3,600 pictures and 30 minutes of sound on presently available film and tape bases. Filmstrip and tape are in separate continuous loops and are electronically programmed to work in synchronization. Animation and motion effects can be achieved as a result of a fast cuing system.

The compact cartridge may be programmed to work at any one of three modes. First, it may be in an automatic or run mode where the user merely inserts the cartridge and sees and hears the synchronized program. Secondly, it may be in the pause or on demand mode wherein the user touches the hold button and the picture remains on the screen while the accompanying audio information is stopped. At his own speed the user advances to the next picture and sound segment which covers new information. Thirdly, the cartridge may be in the response or programmed instruction mode wherein the user may respond to programmed instruction material and interact with it. A jack-in accessory, called the response device, scores answers, advancing the program only when the student selects an answer by pressing on one of the response buttons. A permanent record of the response may be retained for the record.

An audio-visual system is provided including a cartridge and an audio-visual housing or projector. The cartridge contains an endless tape on one reel and an endless filmstrip in a loop. Means are also provided on the cartridge to bring the continuous tape and continuous filmstrip into communication with openings to the exterior of the cartridge. The audio-visual housing is adapted to receive the cartridge and start means on the housing are provided responsive to reception of a portion of the cartridge within the housing to activate a tape drive motor, a lamp and a power source. Tape engaging and audio pick-up means are in the housing to engage the exposed portion of the tape when the cartridge is received in the housing and is responsive to the tape drive motor to drive the continuous tape. Audio means are in the housing in communication with the pick-up head means to audibly transmit the sound track from the tape. Discriminator means are positioned in the housing in communication with the pick-up head to receive and respond to control signals received from the tape. Film transport means are also in the housing to engage the exposed portion of the filmstrip when the cartridge is received in the housing and is adapted to transport the film. Film advance means is positioned in the housing and is in communication with the discriminator means and the film transport means so that when a signal is received by the discriminator means it will respond by causing the film advance means to drive the film transport means and transport the film to thereby permit the tape and film to be advanced in a predetermined sequence. A projector lens is located in the housing and is aligned with the exposed portion of the film when the cartridge is positioned in the housing. Condenser and director means are in the housing and are in association with the lamp to condense and direct light from the lamp onto the mirror of the cartridge positioned in the housing from which it is reflected to the rear of the film and passes through the film and aligned lens and thereby projects an image of the exposed frame of film. Finally, cooling means is positioned in the housing to assist in preventing excessive heating of the exposed filmstrip and the interior of the housing.

BRIEF DESCRIPTION OF THE DRAWINGS

In the drawings:

FIG. 4 is a sectional side elevation view thereof taken along the plane of line 4—4 of FIG. 1;

FIG. 5 is a side elevation view thereof taken along the plane of line 5—5 of FIG. 1;

FIG. 12 is a side elevation view of the tape portion of the cartridge of the system;

FIG. 13 is a side elevation view of the filmstrip portion of the cartridge of the system;

FIG. 14 is a side elevation view of the divider member between the tape and filmstrip portions of the cartridge of the system;

FIG. 16 is a fragmentary sectional view of the cartridge portion of the system taken along the plane of line 16—16 of FIG. 14;

DESCRIPTION OF THE PREFERRED EMBODIMENT

Figure 1:
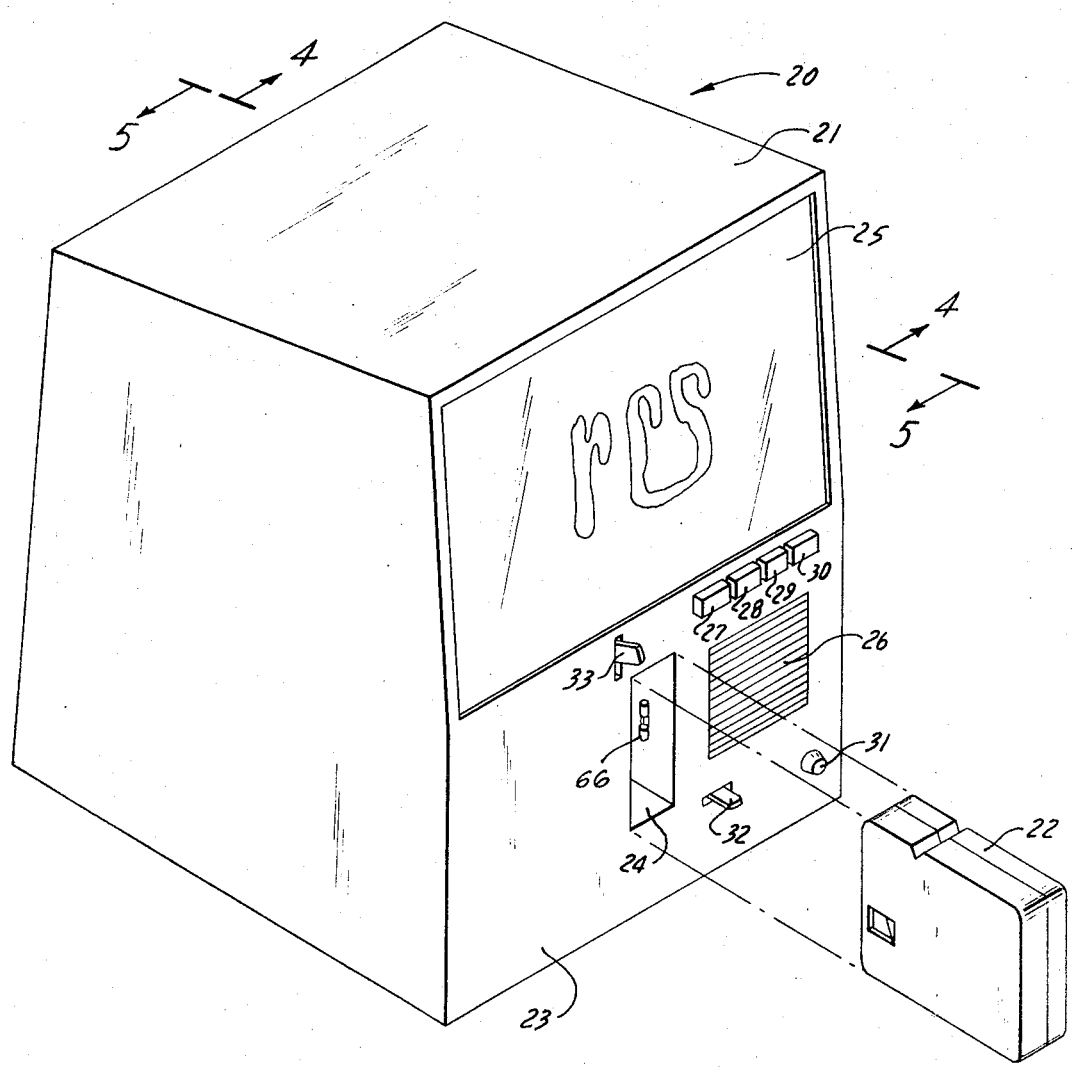
FIG. 1 is a perspective view of the audio-visual system of the invention.

As depicted in FIG. 1, the audio-visual system 20 is comprised of two cooperating components. There is an audio-visual housing or projector 21 and a cartridge 22 containing an audio tape and a filmstrip.

The front face 23 of housing 21 contains an opening 24 substantially corresponding to the height and width of cartridge 22 so that cartridge 22 may be received within opening 24 of housing 21. Thereafter, mating portions of cartridge 22 and portions of the interior of housing 21 cooperate to functionally operate audio-visual system 20. These features will be discussed in detail below.

Front face 23 also contains a projection screen 25 upon which an image can be projected from the interior of housing 21 to be viewed from the exterior thereof. Speaker openings 26 are also present on front face 23 so that the sound transmitted by the system will be projected therefrom.

A number of other controls are also present on front face 23 including a pause and brake button 27, an advance button 28, a retard button 29 and a start button 30. A volume control 31 is provided to regulate the audio transmission from speaker openings 26. A manual focus control 32 and a manual framing control 33 are also present on the front face of housing 21. In this manner, the majority of the operating controls of system 20 are readily available to the operator on the front side or face 23 of housing 21. Additionally, by providing a receptacle for the cartridge on the front face of housing 21, the majority of operational functions of the entire system may be carried out on the front face of the housing thereby increasing the efficiency of operation of the entire system.

The internal components of cartridge 22 are shown in detail in FIGS. 8-16. The cartridge as shown in those figures contains an outer cover 22a. The outer casing and cover 22a may be of a transparent or nontransparent plastic material as desired. Basically, the cartridge contains two rectangular shaped portions in side-by-side relationship. One portion is a tape carrying portion 34 having a side wall and a perpendicular extending continuous end wall to form a cavity 35. Mounted in cavity 35 is an endless length of tape 36 on a reel 37. Cam locks 37' are employed to facilitate the easy installment and removal of the tape reel to the tape hub.

The film carrying portion 38 also has a side wall equivalent in size to the side wall of tape carrying portion 34 and a perpendicular end wall around its perimeter which mates and engages with the end wall on the perimeter of portion 34. The side wall and continuous end wall of portion 38 forms cavity 39 to receive an endless length of film 40 positioned on a reel 41 mounted to the side wall of portion 38. Alternatively, the loop of film may be positioned around a post or posts or independent of central guide means. When portions 34 and 38 are engaged the perimeter end walls of each member will mate to form a closed container with reels 37 and 41 in side-by-side relationship within the cartridge 22. A divider 42 which may also be constructed of plastic is positioned between reels 37 and 41 to maintain the film 40 separate from tape 36. Divider 42 is contained within cartridge 22. Any common fastening means such as a screw may be utilized to maintain portions 34 and 38 in a connected relationship with divider 42 held therebetween.

As may be best seen in FIG. 12, the continuous length of tape 36 is fed from the inside of the roll and is taken up on the outside of the roll after it is fed through the pick-up portion of cartridge 22. In order to facilitate feeding of tape 36 an upstanding wall 43 projects from the side wall of portion 34 and is positioned so that tape 36 comes into contact therewith during the feeding operation and is twisted or directed into an approximate 90° turn.

Tape 36 then rotates back to its initial angle with respect to reel 37 as it is fed onto roller 44 or, post if desired, mounted on portion 34. The tape then passes through aperture 45 in the front and face where it may be contacted by an audio head. A resilient pad 46 is mounted on portion 34 in alignment with aperture 45 to facilitate a continuous and uniform contact between an audio head and tape 36 which moves across the adjacent surface of resilient pad 46. The tape then passes through a second aperture 47 where a second audio head may contact tape 36. A resilient pad 48' is mounted in portion 34 similar to pad 46 and is aligned with aperture 47 to provide a similar type base for the tape contacting the pick-up head. Either aperture 47 or aperture 45 may be the primary aperture for audio purposes. The tape next passes a third aperture 48 in portion 34 where it is contacted by a drive mechanism mounted in the housing as will be described below to drive the continuous tape 36. In order to facilitate contact between tape 36 and a drive mechanism a wheel 49 is rotatably mounted on pin 50 and is in alignment with aperture 48. When the cartridge is disassembled, the wheel may easily be slidably removed from the pin. A pivotally mounted arm 51 is mounted to portion 34 by means of pin 52 extending from the side wall of portion 34 and mounted to one end of arm 51. The other end portion of arm 51 contains a pin 50 molded thereto. Wheel 49 is rotatably mounted on pin 50. A spring 53 mounted in the side wall of portion 34 is in contact with the rear portion of arm 51 so as to bias arm 51 and wheel 50 in the direction of aperture 48. In this manner, wheel 49 is maintained in a position which facilitates communication between tape 36 and the drive mechanism.

The tape then passes through guide means 54 extending from the side wall of portion 34 until it once again is taken up on the outside of reel 37. Additional guide means 55 are positioned in portion 34 to assure that tape 36 is properly returned onto reel 37.

As particularly shown in FIG. 13, portion 38 of cartridge 22 contains the endless strip of film 40 on reel 41. The path of travel of film 40 is determined by the remaining internal structure of portion 38. A perpendicular shoulder or projection 56 extends from the side wall of portion 38 and is aligned with the film so that as the film is pulled from the interior of the reel it will contact wall 56 and will be twisted to approximately a 90° turn which flattens the film out with respect to the side wall of portion 38. This facilitates passage of the filmstrip from the interior of the coil of film through the feeding and projection area and finally directed onto the outside of the coil of film. The film is turned flat to permit it to pass over the coil of film on the film reel and then to return to a vertical position in essentially the same plane as the coil of film. After the film has passed the area adjacent to wall 56 in portion 38, it is re-oriented to its initial position with respect to the side wall as it is taken up on roller 57 for feeding into the projection area. Roller 57 is rotatably mounted to side wall 38. After the filmstrip has pased roller 57, it enters plastic aperture plate 57'. Aperture plate 57' is constructed of two aligned and spaced strips of plastic material in spring loaded engagement. The spaced relationship between the two strips provides a passageway therethrough for the film. Internal shoulders maintain the film in a defined position as it passes through plate 57'. Apertures are provided in the strip to permit access to the sprocket holes of the film and an opening is provided for the frame being projected. Film is side guided within the plastic strips to assure one side of the film is always bearing on one edge of the plastic plate.

The plate 57' has a handle-like projection 58' mounted on its internal surface and containing a notch 59' partially surrounding a post 60' on the side wall 38. The resilience of plate 57' facilitate its capture between post 60' and the end wall of side wall 38. This serves to retain the film in positive position as it is being projected and advanced.

After the filmstrip has passed roller 57, it enters plate 57' and comes into alignment with opening 58 in the end face of portion 38. As will be described below, opening 58 permits access for a film transport means to engage with the sprocket holes in the filmstrip and advance the endless coil of film 40 upon the proper stimulation from the audio-visual system. As the film is advanced, it then comes into alignment with a projection opening 59 in the same end wall of portion 38 and below and in alignment with opening 58. The aperture plate is designed to apply pressure to the film on all four sides of the projected frame only on the frame in alignment with opening 58 at any given time. When cartridge 22 is inserted into housing 21, and the audio-visual system is activated, light will be directed through opening 60 in the side wall of portion 38. A mirror 61 is mounted on structure extending inwardly from the side wall of portion 38 and is directed at an angle so that light passing through opening 60 in the side wall will be reflected through the filmstrip and thereafter through opening 59 to project an image to a lens mounted in housing 21. In this manner, light can be passed through the filmstrip from behind for projection purposes.

Thereafter, guideposts 63 and 64 extending inwardly from the side wall of portion 38 assist in directing the filmstrip onto the outside of the endless coil of film on reel 41. The operation of the light being directed through opening 61 and reflected by mirror 62 through the film and out through aperture 59 is shown in detail in FIG. 15 of the drawing.

In regard to movement of the coil of filmstrip, particularly in the necessity for twisting the filmstrip as it exits from the interior of the coil of film and prior to its take-up on roller 57, a recess 65 is provided in separator member 42. Recess 65 permits the film when twisted to assume its natural configuration and extend partially into the tape portion 34 of the cartridge. This facilitates retention of a minimal dimensioned cartridge since the tape portion accommodates the protruding portion of the film. The film does not extend far enough portion 34 to interfere with movement of the endless tape. However, it does permit the film to be twisted into the flat configuration with respect to the side wall of portion 38 and then reoriented to its original position when taken up on roller 57 without causing any damage to the film in the form of permanent kinks or folds which could later have a deleterious effect upon the filmstrip over a long period of use. In this manner, the film is not unduly confined during movement to and from reel 41.

FIG. 16 shows the positioning of recess 65 with respect to cartridge 22 in detail.

When portions 34 and 38 are assembled along with separator member 42, they are engaged in a manner which will permit apertures 45, 47 and 48 of portion 34 to be aligned with apertures 58 and 59 in portion 39. This forms an interface for reception into housing 22 in a manner which will permit the system to coordinate activity within housing 21 with activity within the cartridge 22.

Figure 2:
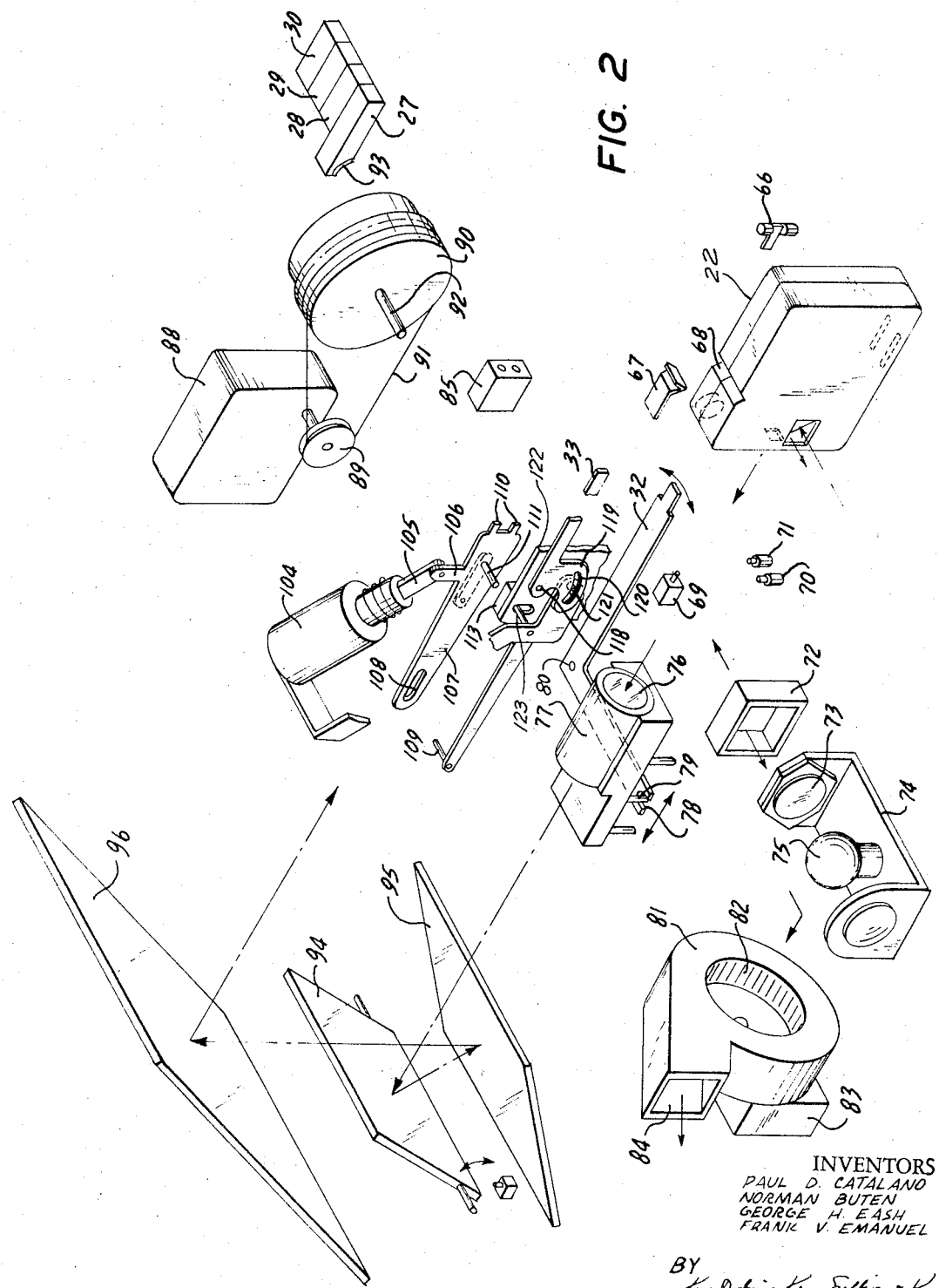
FIG. 2 is an exploded perspective view of the internal components of the audio-visual housing and a perspective view of the cartridge of the invention.

Turning to the contents of system 20 which are located in housing 21, FIG. 2 displays these components in their relative locations to one another and to cartridge 22.

The respective elements of the system as shown in FIG. 2 should be taken in conjunction with the assembly views of the system as shown in FIGS. 4–7 of the drawings. Upon insertion of cartridge 22 into cavity 24 of housing 21, it is important that the cartridge be properly positioned within the cavity so that its interface is properly positioned for operation of the system. To assist in this regard, a side guide roller 66 is provided on the side of cavity 24 opposite to the side containing aperture 60 so that the side wall of cartridge 22 containing aperture 60 is brought into flush contact with the adjacent side wall of cavity 24. A snap clip 67 is mounted in the housing and passes down through the upper surface of cavity 24 with a downwardly extending lip adapted to snap into recess 68 in the top surface of cartridge 22. Therefore, when cartridge 22 has been properly inserted the requisite distance into cavity 24, spring clip 67 will snap into position in cavity 68. Simultaneously, the forward interface of cartridge 22 will engage switch 69 and initiate operation of the system 20.

Optional switches 70 and 71 may be incorporated with the system to operate in cooperation with the housing and cartridge to switch to a response mode if desired or another different operating sequence as discussed above and below.

Mounted in the housing is a tunnel-like rectangular shaped structure 72 having a passageway therethrough. Tunnel 72 is mounted in the housing so as to be in alignment with opening 60 in cartridge 22 when cartridge 22 is properly positioned in housing 21 for operation. The other side of tunnel 72 is aligned with opening 73 in lamp housing 74 and lamp 75. Lamp housing 74 is mounted in fixed position in housing 21. Light from lamp 75 may then pass through lamp housing opening 73 and through the passageway in tunnel 72 and into opening 60 in cartridge 22 from where it will be reflected by mirror 61 onto the rear side of the exposed portion of filmstrip 40 positioned at opening 59.

The light containing the image then passes from opening 59 into and through a lens 76 in alignment with opening 59 for projection. Lens 76 is positioned in lens housing 77 which is slidably mounted in housing 21. Manual focus 32 which has one end extending outwardly from housing 21 for the operator to grasp and has its other end at right angles thereto for engagement with slidable lens housing 77 is mounted in housing 21. The end of focus arm 32 which engages with lens housing 77 has a notch 78 therein which mates with a downwardly extending prong 79 on lens housing 77 so that when the exposed end of focus arm 32 is horizontally moved from left to right, pin 79 and consequently housing 77 will be moved toward or away from opening 59 in cartridge 22. To facilitate this transfer of movement, arm 32 is pivotally mounted in housing 21 at point 80 along its elbow-shaped length.

A blower 81 is mounted in housing 21 and is positioned adjacent to lamp 75 and lamp housing 74 so that the inlet portion 82 of blower 81 is in communication with the area surrounding lamp 75. A drive motor 83 is attached to blower 81. When motor 82 is started, air will be sucked into inlet portion 82 of the blower as it operates and will be blown out through outlet passage 84 of blower 81 which is in communication with vents (not shown) in the outer surface of housing 21. In this manner, hot air may be sucked into blower 81 and exhausted from housing 21 through the air vents in communication with outlet passage 84 of blower 81. Additionally, by sucking air into blower 81, cooling of the film exposed to light from the lamp is facilitated. It is extremely difficult to cool the film properly by blowing air past it as it is being projected in order to prevent overheating and buckling of the film. With the structure employed in this system, air is drawn past the film by the suction blower 81 in a manner which permits a larger amount and faster flow of air in the immediate vicinity of the film than is possible by any attempts to cool the film by blowing air past it. As air is sucked into the intake portion 82 of blower 81, which thereby draws off the hot air surrounding lamp 75, additionally air is drawn through opening 73 in lamp housing 75, the passageway through tunnel 72, and openings 45, 47, 48, 59 and 60 in cartridge 22 aligned with tunnel 72. Since the intake opening 82 is considerably larger than the interconnected passageway through openings 59, 60, 72 and 73, a relatively high velocity flow of air is provided through those passageways and simultaneously past filmstrip 40 exposed in opening 59. In this manner, a suction effect is created and the high speed stream of air passing immediately adjacent to filmstrip 40 at opening 59 serves to properly cool the filmstrip and adequately prevents buckling and overheating of the film. This suction effect created by blower 81 serves to properly cool the interior of housing 21, filmstrip 40 and lamp 75. Natural and planned openings in the remainder of housing 21 provides sufficient access for the replenishment of air which is exhausted through exhaust opening 84 in blower 81.

Once cartridge 22 is properly inserted in cavity 24 of housing 21, a common type of audio pick-up head 85 is brought into communication with exposed portions of tape 36. A shaft 92 which is part of the drive means engages with the portion of tape 36 exposed in aperture 48 of cartridge 22 in order to properly drive the continuous length of tape and the audio-sensing means in the form of pick-up head 85 engages with the portion of tape 36 exposed in aperture 47 of cartridge 22. In this manner, as tape 36 is being driven by drive means shaft 92, audio-sensitive means 85 is receiving the contents of the tape for operation of the system.

A tape drive motor 88 is mounted in housing 21 and its shaft and drive wheel combination 89 is connected to fly wheel 90 by means of drive belt 91. Shaft 92 connected to rotating fly wheel 90 and rotated simultaneously therewith is positioned so as to engage and to drive the tape in cartridge 22. All of these interconnected elements including motor 88, fly wheel 90 and pick-up head 85 are mounted in any well known convenient manner in housing 21 which will permit them to operate functionally in the system.

As previously discussed, the pause and brake switch 27 which is mounted in the housing and may be manually operated from the exterior of the housing also extends inwardly of housing 21 and is slidable with respect thereto. The inner end portion of switch 27 contains an arcuate recess 93 which corresponds in configuration to the outer circumferential surface of fly wheel 90. Therefore, when pause and brake switch 27 is depressed, arcuate surface 93 on the inner portion thereof will come into engagement with the other surface of fly wheel 90 and will immediately stop fly wheel 90. This will immediately stop the tape drive and will prevent an overrun of the tape past the desired stop point as the fly wheel slows down and consequently the driven tape slows down. Tape 36 will be stopped immediately thereby preventing any overrun beyond the stop point.

It should be noted that separate motors are provided for the tape drive and for operation of blower 81. Tape drive motor 88 can then be shut off when desired without the necessity of blower motor 83 being simultaneously shut off. Therefore, the cooling process within housing 21 will be continued even when all movement has been stopped in the remainder of the system. This assists in maintaining a proper temperature within housing 21 and also assists in preventing overheating of filmstrip 40 when the tape drive has been stopped.

As discussed above, the system is designed for two types of projection. In one type of projection, the image is projected in the form of a rear screen projection on screen 25 forming a portion of the front surface 23 of housing 21. The system is also adaptable for projecting the image outside of housing 21 directly onto a wall or screen.

When the system is to be utilized for projection onto screen 25 of housing 21, as shown in FIG. 2, the image is projected from lens 76 onto a rear mirror 94 in housing 21. The direction of travel of the projected image is depicted in FIG. 2. Mirror 94 is tilted with respect to the vertical so that the image is reflected as shown downwardly onto a second mirror 95. Mirror 95 is tilted with respect to the horizontal so that the projected image is then reflected upwardly to a third mirror 96. Mirror 96 is tilted with respect to the vertical so that the image is then reflected onto the rear of screen 25 where it may be viewed from the exterior of housing 21.

When it is desired to project the image onto a wall or screen, the portion of housing 21 containing first mirror 94 is moved with respect to the remainder of housing 21. FIG. 4 illustrates the structure which facilitates this operation. An opening in the rear of the housing is normally occluded by housing flap 97. Housing flap 97 is pivotally mounted in a convenient manner at point 98 to the remainder of housing 21. As shown in FIG. 4, mirror 94 is mounted in a convenient recess in flap 97.

A pin 99 extends from flap 97 and sits in arcuate slot 100. Pin 99 is additionally anchored to housing 21 by means of spring 101 fastened at point 102 to the housing. When flap 97 is in the closed position as shown in FIG. 4, pin 99 is in the upper corner of slot 100 and the force derived from spring 101 assists in retaining flap 97 in the closed position. Conversely, when flap 97 is manually moved downwardly in slot 100 so that pin 99 reaches the lowest point in slot 100, the force exerted by spring 101 will once again serve to retain flap 97 in the down position. In this manner, flap 97 may be moved to either the up or closed position or the down and open position as desired and the flap will remain in that position until manually shifted to the other position.

When the operator pushes down on flap 97 so as to move pin 99 to the lower end of slot 100 it will contact switch 103. Switch 103 is connected in a conventional manner to lamp 75 so that when it is activated by a manual movement of flap 97 until bar 99 contacts switch 103 lamp 75 will be switched from a normally low intensity brightness to a high intensity brightness to facilitate the projection of the image exteriorly of housing 21 onto a wall or screen. Similarly, when flap 97 is once again shifted to its upward or closed position so that the projected image contacts mirror 94 switch 103 will be deactivated and lamp 75 will return to its low intensity of brightness which is all that is necessary for projection on screen 25. Alternatively, a manually operated switch may be employed in place of automatic switch 103 for the same purpose.

No other function is necessary in order to change from rear screen projection on screen 25 to direct projection onto a wall or screen exterior of housing 21. All that need be done is flap 97 be shifted between the open and closed positions. Naturally, whatever focus adjustment might be necessary can be carried out by means of manual focus arm 32 extending from forward face 23 of housing 21.

Figure 5A:
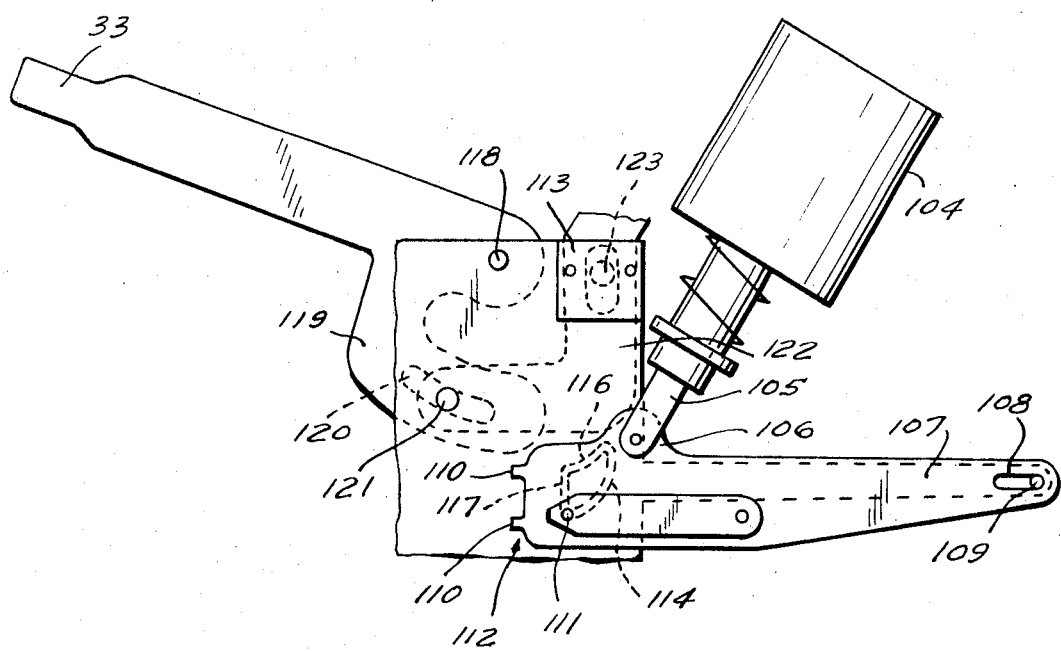
FIG. 5a is an enlarged view of the film transport and framing mechanism of the invention.
Figure 6:
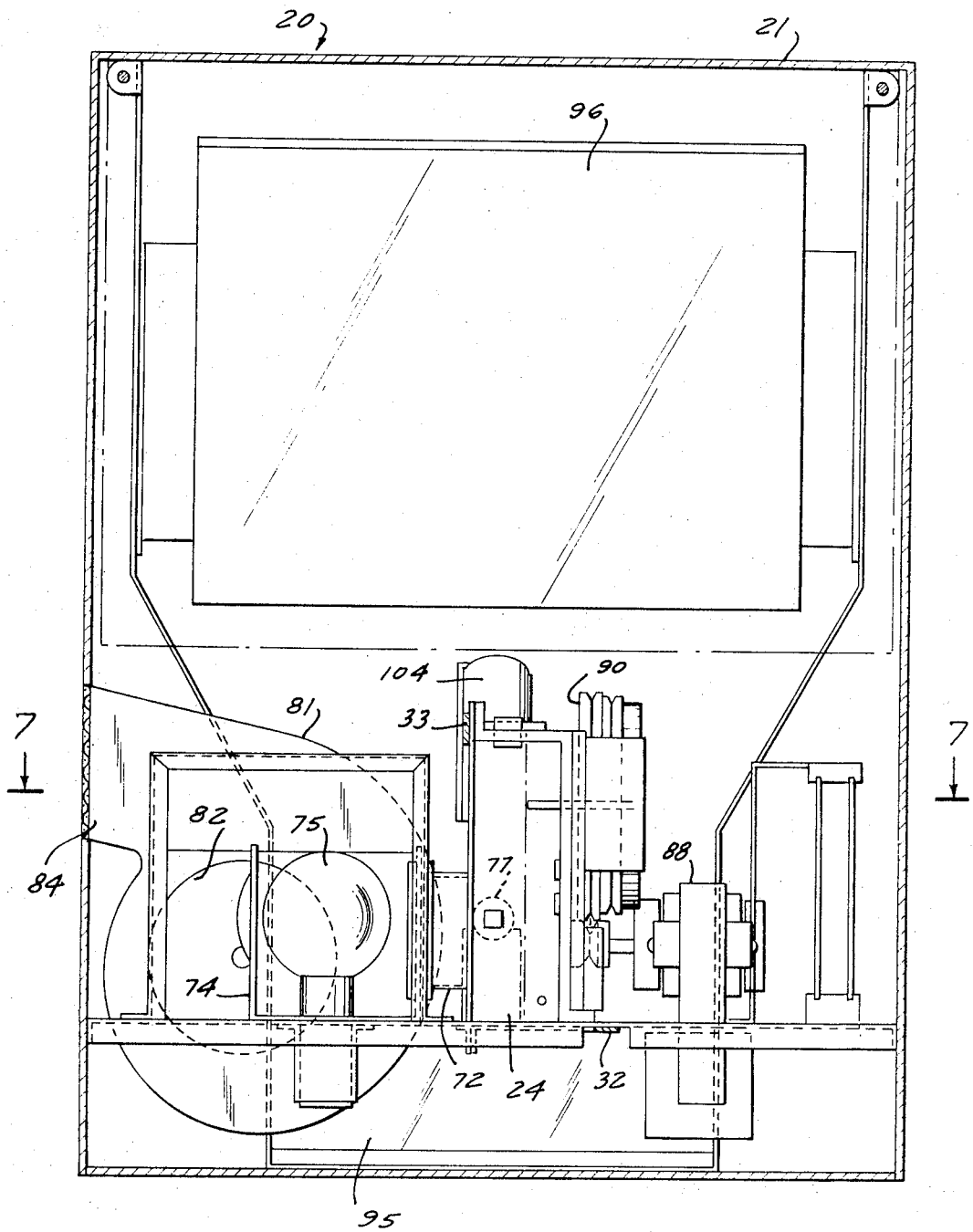
FIG. 6 is a sectional front elevation view thereof taken along the plane of line 6—6 of FIG. 4.
Figure 7:
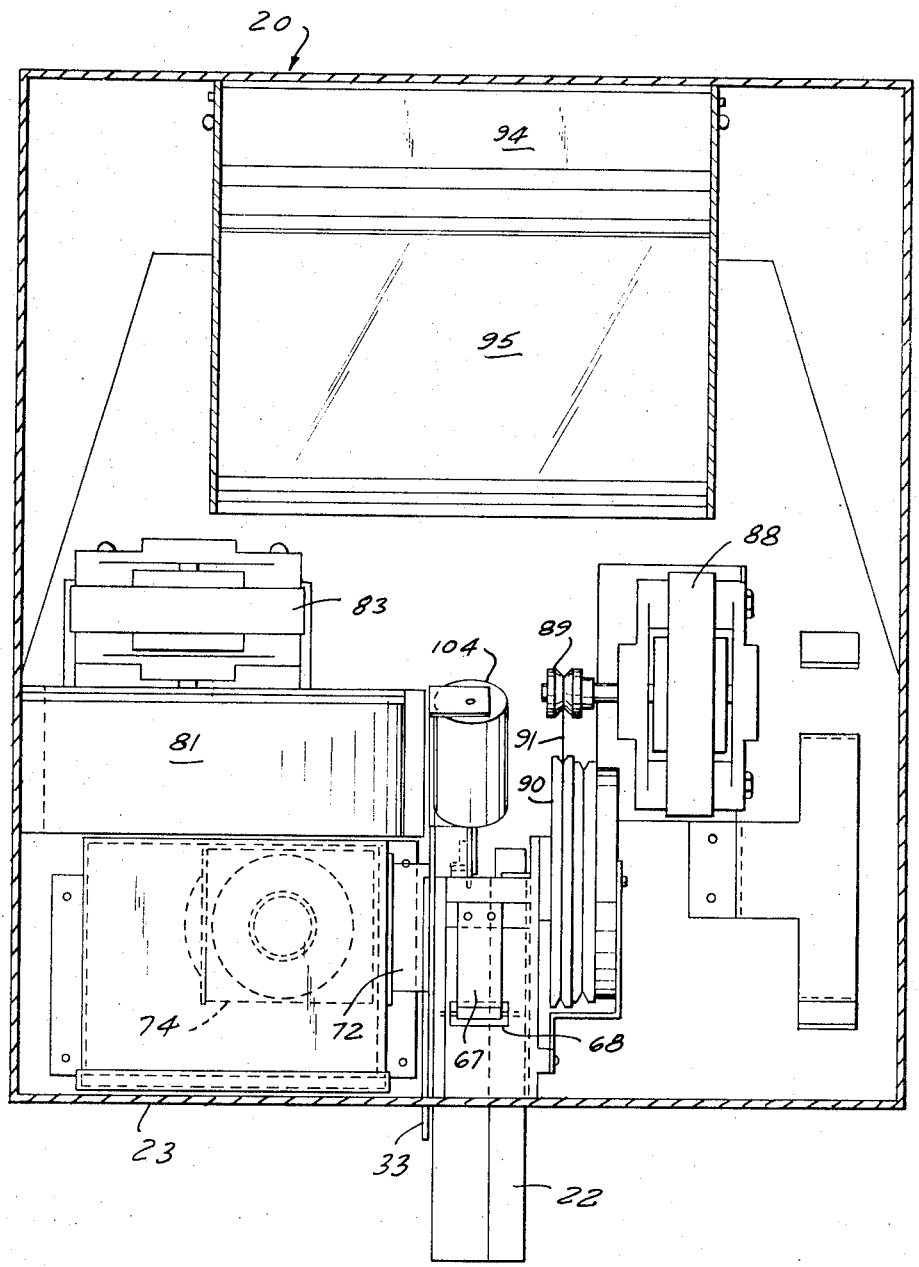
FIG. 7 is a sectional top view thereof taken along the plane of line 7—7 of FIG. 6.
Figure 10:
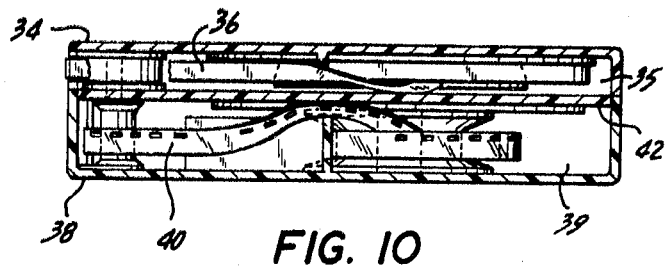
FIG. 10 is a top plan view thereof.
Figure 9:
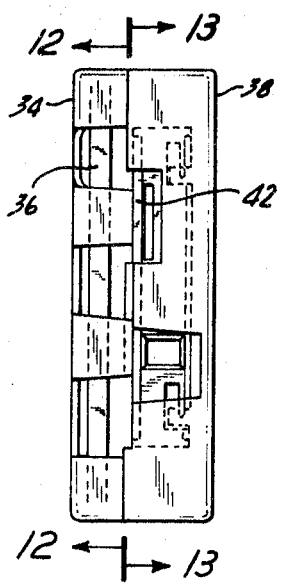
FIG. 9 is an end elevation view thereof.
Figure 8:
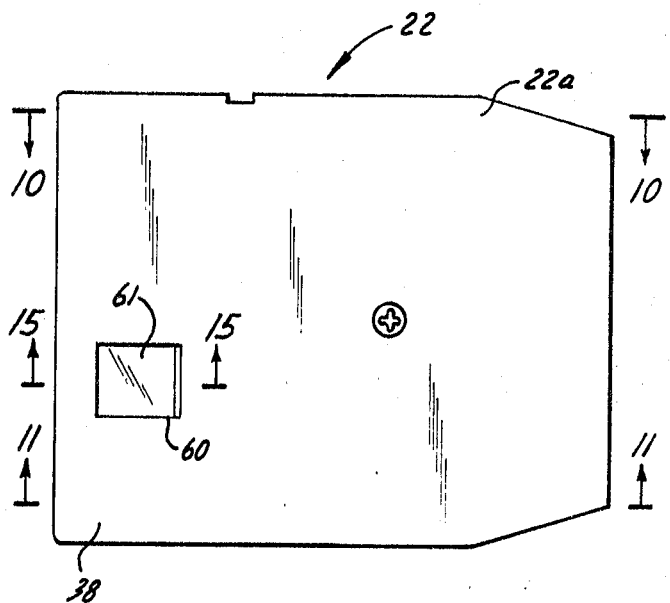
FIG. 8 is a side elevation view of the cartridge portion of the system.
Figure 15:
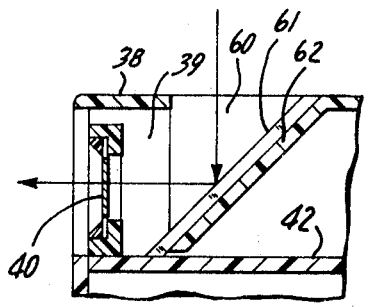
FIG. 15 is a fragmentary sectional view of the filmstrip projection aperture portion of the cartridge taken along the plane of line 15—15 of FIG. 8.
Figure 11:
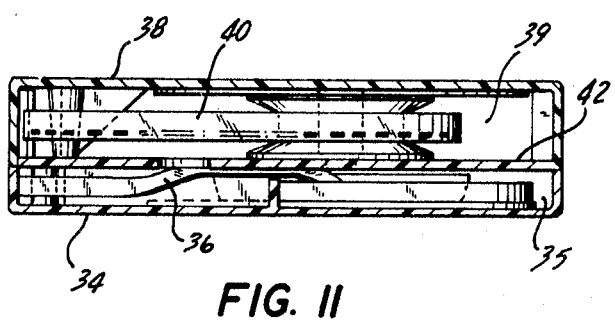
FIG. 11 is a bottom plan view thereof.

The film advance means and the film transport means which is responsive to audio signals from the tape and cartridge 22 are best depicted in FIGS. 2 and 5. The manner in which the film advance and transport mechanism respond to the tape in cartridge 22 will be discussed in detail below. In operation, solenoid 104 is responsive in this system to a signal which will cause solenoid arm 105 to be retracted. The exposed end of solenoid arm 105 is connected in a convenient manner to an upstanding prong 106 on film transport arm 107. The rear end of film transport arm has a longitudinal slot 108 which is adapted to receive a pin 109 extending from a portion on the interior surface of housing 21. Pin 109 is slidable in slot 108 so that film transport arm may be slidably reciprocated between a film engaging position and a film disengaging position. A forward end of film transport arm 107 contains a pair of prongs or claws 110 extending therefrom. Prongs or claws 110 have a cross-sectional configuration corresponding to the sprocket holes in filmstrip 40 so that they may be extended into a pair of successive sprocket holes for engagement with filmstrip 40.

A cam follower 111 extends perpendicular to the lateral surface of film transport arm 107 and is positioned in cam slot 112 formed in cam block 113. Cam block 113 is mounted to the interior surface of housing 21 as shown.

Film transport arm is shown in the film engaging position in FIG. 5 with the cam follower located in the lower forward portion of cam slot 112. In this position, claws 110 will engage with two of the sprocket holes of filmstrip which are exposed in aperture 58 when cartridge 22 is properly positioned within cavity 24.

When solenoid 104 is activated by the system, solenoid arm 105 will be retracted thereby withdrawing film transport arm 107 from contact with filmstrip 40. As film transport arm 107 is withdrawn, cam follower 111 will follow the arcuate path 114 formed in cam block 113 until it reaches the apex of cam slot 112. Simultaneously, slot 108 permits pin 109 to slide with respect thereto permitting free movement of film transport arm 107 in the rearward direction. Solenoid arm 105 and upstanding prong 106 of arm 107 are connected in a pivotal manner to permit whatever rotational movement is necessary in the upward path of travel of arm 107 as it is retracted.

When the solenoid arm has been fully retracted and transport arm 107 is at the apex of cam slot 114, the solenoid will be deactivated and return spring 115 will force solenoid arm and consequently film transport arm down along the substantially horizontal and slightly inclined upper portion 116 of cam slot 112 until it once again engages filmstrip 40. In this position claws 110 will have engaged two different sprocket holes along the length of exposed filmstrip from that previously engaged. Cam follower 111 will then enter the substantially vertical third portion 117 of cam shot 112 and it will vertically snap or spring to its initial position at the base of the film slot and will advance the filmstrip a distance substantially the same as its vertical drop in slot 117. This is accomplished by means of claws 110 drawing filmstrip 40 down until arm 107 has reached its initial position. In this manner, the next frame on the filmstrip is drawn into alignment with aperture 59 for projection of the image contained thereon. It will be noted that steps are provided at the adjoining points of portions 114, 116 and 117 of cam slot 112 to prevent the follower from proceeding in the wrong direction.

As previously discussed, should the frames be misaligned with respect to the projection aperture, a manual framing control 33 is provided in the housing. Framing control 33 includes a movable arm extending outwardly and inwardly with respect to housing 21 and is mounted therein. As shown in FIGS. 2 and 5, framing adjustment arm 33 has its forward end exposed exteriorly of the housing for grasping and movement in a vertical direction to adjust the frame. The rear end of arm 33 is pivotally mounted at point 118 on the inner surface of housing 21. A foot 119 extends downwardly from the rear end portion of arm 33 and contains a cam slot 120 of slightly arcuate configuration to receive a cam follower 121. Cam follower 121 is supported by cam slot 120 and is mounted at its other end to a vertically movable bracket 122. Bracket 122 has an extension thereon to support pin 109 and additionally supports pin 123 which passes through a supporting surface on the housing and it is connected at its remote end to cam head 113. Pin 123 is slidably housed in a vertical slot 124 in the rigid housing surface to permit movement of pin 123 in a vertical direction a predetermined distance. Since pin 123 is interconnected with a variety of members which in conjunction form the film advance means, the film transport means and the manual framing adjustment, all of these elements may be vertically reciprocated a desired amount in order to bring the frame into proper alignment for projection purposes. As shown in FIG. 2, pin 123 is in its uppermost position. To adjust the frame being projected from this position, the exposed end of manual framing arm should be grasped and moved downwardly.

As arm 33 is moved downwardly, it will pivot about point 118 and pin 121 will move in cam slot 120 and the engaging surfaces therebetween will force pin 121, arm 122 and pin 123 downwardly thereby moving the remainder of the assembly downwardly and adjust the frame of the filmstrip being exposed accordingly. Vertical movement of manual framing arm 33 causes consequent vertical movement of all interconnected members. This includes pin 121, bracket 122, pin 109, cam head 113, film transport arm 107, and solenoid 104.

Figure 17:
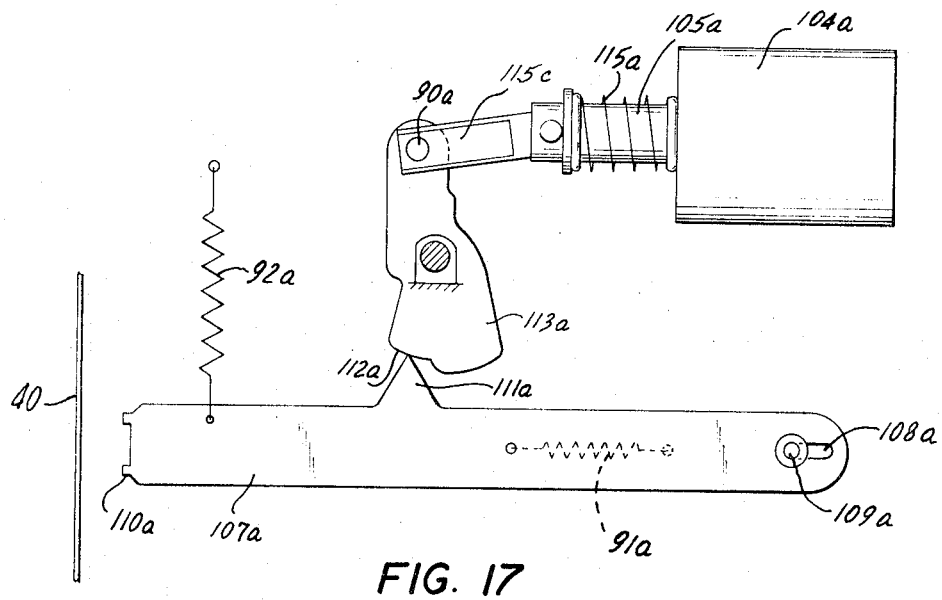
FIG. 17 is an alternative film advance and transport mechanism adapted for use in the system.
Figure 18:
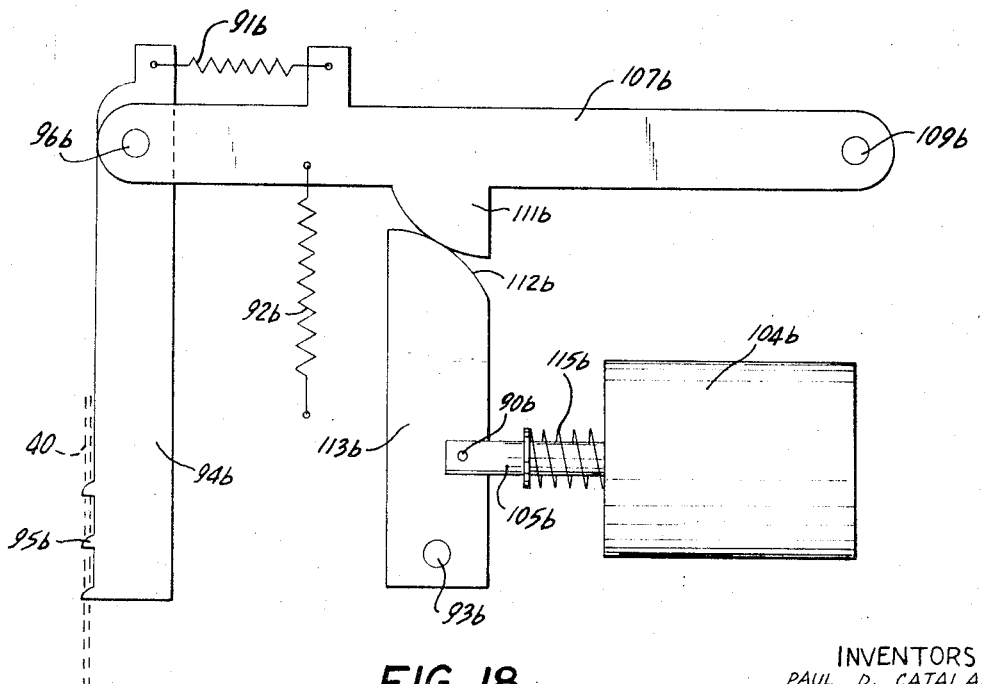
FIG. 18 is a second alternative film advance and transport mechanism adapted for use in the system.

Two alternate film transport mechanisms are shown in FIGS. 17 and 18. These are both adapted to be utilized with the remainder of the system in a similar manner as the above described film transport mechanism.

The embodiment of FIG. 17 includes a cam member 113a pivotally mounted to solenoid arm 105a of solenoid 104a at point 90a. A return spring 115a is positioned on arm 105a.

The lower end of cam 113a contains a stepped cam surface 112a. Surface 112a is positioned to engage with cam follower 111a extending upwardly from transport arm 107a. Arm 107a includes a pair of claws 110a at one end to engage and transport the film and a slot 108a in its rear end portion in which to mount a pin 109a and permit reciprocal motion of arm 107a. Springs 91a and 92a are appropriately positioned with one end mounted to the housing and the other end mounted to arm 107a.

In operation, when solenoid 104a is actuated solenoid arm 105a will be retracted pivoting cam 113a through the intermediary alignment link 115c. Cam follower 111a is held in intimate contact with cam 113a by spring 92a or the vertical force component of an alternate spring. The alternate spring can be used in place of springs 92a and 91a and would have one end connected to arm 107a and the other end connected to cam 113a. Preferably the end connected to arm 107a would be connected adjacent to the portion terminating in claws 110a and the other end connected to the forward portion of cam 113a and adjacent to pin 90a. The rotation of cam 113a first serves to force arm 107a horizontally left toward the film 40, overcoming the force of spring 91a, or alternatively, the horizontal component of the alternate spring. When arm 107a has moved sufficiently such that the right hand end of slot 108a bears up against pin 109a, the horizontal movement of arm 107a ends. At this position, teeth 110a of arm 107a have entered engagement with the sprocket holes of film 40.

Cam 113a continues to rotate counterclockwise driven by solenoid 104a. Since arm 107a can move no further horizontally, it is driven downward, advancing film 40 one frame. Rubber "O" rings, on solenoid arm 105a on either end of return spring 115a, serve to deaden operating noise of solenoid arm 105a.

When solenoid arm 105a is fully actuated, cam follower 111a rests on the bottom lobe of cam 113a, the shape of which offers no resistance to the horizontal movement of arm 107a. Spring 91a, or alternatively the horizontal force component of the alternate spring, exerts a horizontal force on arm 107a which causes it to move rapidly to the right until left hand end of slot 108a of arm 107a bears once more against pin 109a. This withdrawal movement causes teeth 110a to disengage from sprocket holes of film 40. Thus while electrical power is applied to solenoid 104a, teeth 110a are brought into engagement with film 40, advance film one frame, and disengage from film. This sequence of events occurs in such a short period of time that the viewer is unaware of any image motion.

Upon release of solenoid arm 105a return spring 115a will return cam 113a to its original position and spring 92a, or the vertical force component of the alternate spring, will return arm 107a to its original position moving up with respect to the film while it is maintained out of engagement with the film.

The embodiment of FIG. 18 includes a cam member 113b mounted at its lower end to the housing at 93b in a pivotal fashion. Intermediate the ends of cam 113b is pivotally mounted a solenoid arm 105b at point 90b. Arm 105b is part of solenoid 104b and has a return spring 115b positioned thereon. The upper cam surface 112b of cam 113b engages with cam follower 111b projecting downwardly from transport arm 107b.

One end of transport arm 107b is mounted in the housing in fixed pivotal position at point 109b. The other end of transport arm 107b has a downwardly projecting tongue 94b pivotally mounted thereto at point 96b. The lower end of tongue 94b has a plurality of projecting horizontal teeth or claws 95b extending therefrom normally in communication with one or more sprocket holes in the film 40. Teeth 95b are flat on the lower side thereof and arcuate on the upper side thereof for the purpose described below. Return springs 91b and 92b are employed, with spring 92b having one end mounted to arm 107b and the other end to the housing. Spring 91b has one end mounted to arm 107b and the other end to tongue 94b.

In operation, when solenoid 104b is actuated by the system, solenoid arm 105b will be retracted causing arm 113b to be pivoted and transport arm 107b and tongue 94b to be moved upward with respect to the film. The arcuate upper surface of teeth 95b will permit the teeth to move upward with respect to the sprocket holes without driving the film 40 upward. The teeth will merely slip in and out of the sprocket holes. When the solenoid is deactivated, return spring 115b will return arm 105b and 113b to its original position thereby permitting spring 91b to pivot tongue 94b toward the film 40 to assure positive engagement between teeth 95b and the sprocket holes of the film and to thereby assist in transporting the film downward one frame by the force of return spring 92b acting on transport arm 107b. The horizontal lower surfaces of teeth 95b facilitates positive driving engagement with the film when moved in the downward direction.

Figure 3:
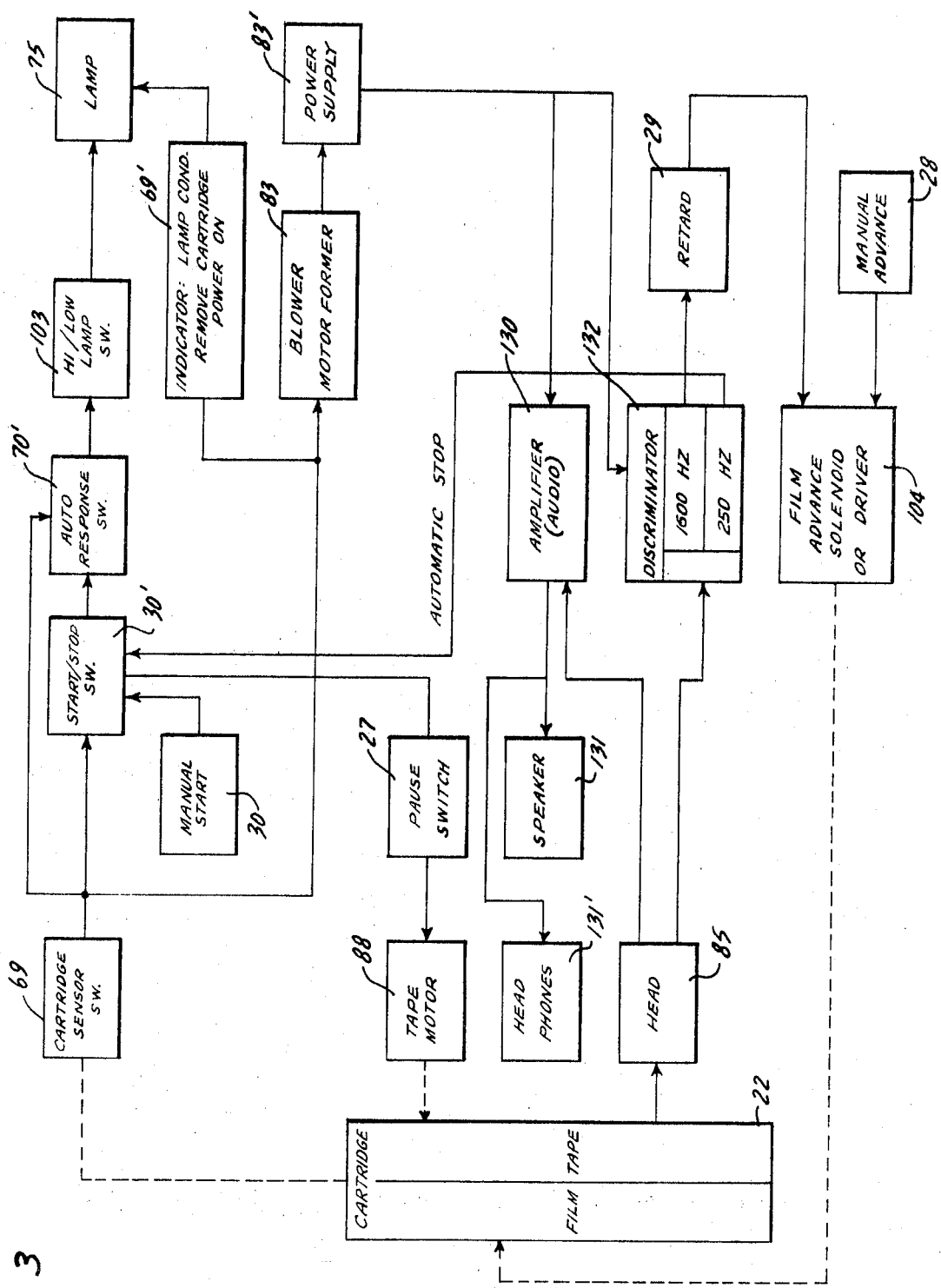
FIG. 3 is a block diagram of the system.

In operation of the entire system, particular reference is made to FIG. 3 which traces the signals received from cartridge 22 and shows the relationship of the various controls in system 20.

When cartridge 22 is inserted into cavity 24 and properly seated therein with respect to housing 21, the cartridge sensor switch 69 is activated upon contact with the interface of the cartridge which brings power to blower-motor former 83 to start the blower and lighting indicator light 69' to indicate that the projector is in standby condition. Manual start 30 on the housing is then activated to start start-stop switch 30' which is connected to tape motor 88 and the projection lamp 75. Start switch 30 starts tape motor 88 and the accompanying drive system to drive the audio tape portion of cartridge 22. Start switch 30 also lights the projection lamp. The pick-up head 85 in contact with the moving audio tape at aperture 47 in cartridge 22, and if desired at aperture 45 in cartridge 22, receives the normal audio portion of the program on the cartridge and transfers that signal through an amplifier 130 and thereafter to speaker 131 which transmits the sound through apertures 26 in housing 21 for the listener. Alternatively, as shown, a set of head phones 131' may be utilized instead of speaker 131. The hook-up between the head, amplifier, and speaker is done in a conventional manner.

Power to the amplifier is supplied by the blower motor-former 83 and connected power source 83' which is utilized as a power source for amplifier 130 as well as other portions of the system as described below.

As discussed above, it has been found that the system will operate satisfactorily by the use of a common type of cartridge tape having a four track system. The first two tracks of the tape carry the normal audio program, the third track is normally left open but can be utilized if desired, and the fourth track carries the non-audible signal which triggers the film advance and film transport mechanism. A second signal is also present to shut off the system at the end of the program. The filmstrip can be of a Super 8 type film for satisfactory operation. Naturally, other types of tape and film may be employed in place of the type of film and tape described herein.

As described above, the normal two-track audio program is picked up by head 85, passed through amplifier 130 and is transmitted through speaker 131 or head phones 131'. As the tape progresses, at a predetermined point a signal is picked up by the head from the fourth track of the tape. This signal is recognized by discriminator 132 connected to the pick-up head in a normal manner. As shown in FIG. 3, by way of example, the discriminator may be employed so that more than one signal may be placed on the tape for pick-up. As shown, discriminator 132 is designed to receive a 1,600 cycle-per-second signal and to receive a 250 cycle-per-second signal and to react appropriately to both. Power to discriminator 132 is supplied by power source 83 as shown, the 250 cycle-per-second signal will cause a response in the discriminator to automatically activate the start-stop switch 30' to stop the system. This is accomplished by the direct connection between the discriminator and switch 30'. In this instance, the 250 cycle-per-second signal is placed at the end of the program to provide the automatic stop at the appropriate time.

When the discriminator has received a 1,600 cycle-per-second signal from pick-up head 85 it transmits that signal to the film advance solenoid 104 which is activated to operate the film transport means as discussed in detail above. The film transport means then shifts the filmstrip to the next frame in line. In this manner, the program on cartridge 22 will run synchronously since the tape supplies audible sound (narration, music, etc.) as well as inaudible advance signals to the film mechanism and an inaudible stop signal to the projector at the end of the program. The program will run continuously until the stop signal is received.

Both film 40 and tape 36 are endless loops where the end of the program on each is spliced to the beginning of the program on each. Consequently, the program can be replayed after the projector has stopped merely by pressing the "start" button 30. No manual rewinding of either film or tape is ever necessary owing to the endless loop configuration of both featuring an intrinsic continuously automatic rewind.

The foregoing describes the projector operation when the automatic-response switch 70' is in the "automatic" position.

When cartridge 22 is removed from housing 21, cartridge sensor switch 69 will be released and the remainder of the system will be automatically shut off.

As noted from FIG. 3 and as discussed above, there are additional switches in the system which provide additional controls for the operator. For example, in the line between start switch 30 and lamp 75 is the high-low mirror switch 103. When start switch 30' initiates operation of lamp 75 the mirror switch 103 may be in the normal low position. As previously discussed, when flap 97 is manually depressed, switch 103 is shifted to the high position to increase the intensity of lamp 75. Switch 103 may take the form of a manual switch 71 if it is desirable.

Automatic-response switch 70' is also positioned in line with start-stop switch 30' and switch 103 or 71 and lamp 75.

The following describes the projector operation when the automatic response switch 70' is in the "response" position. When cartridge 22 is inserted into cavity 24 and properly seated therein with respect to housing 21, the cartridge sensor switch 69 is activated upon contact with the interface of the cartridge which brings power to blower-former 83 to start the blower, light the projection lamp, and light an indicator light 69' to indicate that the projector is in standby condition. Manual start 30 on the housing is then actuated to start start-stop switch 30' which is connected to the tape motor 88. Start switch starts tape motor 88 and accompanying drive system to drive the audio tape portion of cartridge 22.

As described earlier, the normal two-track program is picked up by head 85, passed through amplifier 130 and is transmitted through speaker 130 or headphone 131'.

As described before, control signals are picked up from the fourth track of the tape and fed to the discriminator 132. When the discriminator has received a 1,600 cycle-per-second signal from the pick-up head 85 it transmits that signal to the film advance solenoid 104 which is activated to operate the film transport means as before. The film transport means then shifts the filmstrip to the next frame in line. In this manner, the program on cartridge 22 will run synchronously, as described above. When the tape supplies an inaudible stop signal, if the automatic-response switch 70 is in the "response" position, the tape motor 88 is stopped and the indicator light 69 lights. Under these conditions the blower-former 83 and projection lamp 75 remain on so that the viewer now is advised by pictorial information on the screen 25 that he is required to respond to programmed instructions. The indicator light advises the viewer that the projector is on standby awaiting his response. The viewer response may be in the form of a directed exercise or experiment or may be made by activating an accessory response device. Upon completion of the indicated response, the viewer causes the program to continue by pressing the manual start button 30, or by operating the remote response device which is jacked into a remote control socket (not shown) through which the projector is restarted by an electrical trigger to the start-stop switch 30'.

The response program progresses in the above fashion through any number of preprogrammed response stops until the program ends. At the end of the program, the viewer is advised by the audible and visual content of the program to remove the cartridge, which turns off the projector, or he is advised to repeat the program by operating the manual start button 30.

Pause switch 27 is positioned in the line between start switch 30 and tape motor 88. Pause switch 27 is normally in the closed position so that the signal from start switch 30 will pass to tape motor 88 and the tape will begin to run upon insertion of the cartridge and manual depression of start switch 30. However, should it be desired to stop movement of the tape at any time during presentation, pause switch 27 can be manually depressed by pushing the button on the exterior front of housing 21 and the tape motor 88 will stop running. In order to prevent overrun of the tape after the pause which is depressed, as discussed above, a mechanical brake is incorporated as part of switch means 27 to engage with fly wheel 90 and stop movement of the tape immediately. Alternatively, an electrical brake switch is contemplated.

A retard switch 29 is positioned in the line between discriminator 132 and the film advance solenoid 104. Retard switch 29 is normally closed so that the 1,600 cycle-per-second signal picked up by discriminator 132 passes directly to the film advance solenoid 104. However, if the audio tape is out of sequence with the filmstrip so that the wrong image on the strip is being projected with respect to the corresponding sound track, the operator may manually open switch 29 since it extends exteriorly of housing 21 through face 23.

By opening retard switch 29, the signal being picked up by the discriminators cannot be transferred to solenoid 104 and in this manner movement of the filmstrip may be stopped until the audio tape once again comes in sequence with the image being shown.

Similarly, advance switch 28 which also extends exteriorly of housing 21 through face 23 is connected to solenoid 104 independently of the connection from the discriminators. Therefore, if it is desirable to advance the filmstrip manually at a greater speed than would be accomplished by the audio signals from the tape, the advance switch may be depressed to activate solenoid 104 and advance the film the desired amount with respect to the tape. In this manner, the filmstrip may be brought into proper sequence with the audio tape by moving the film with respect to the tape rather than the tape with respect to the film as accomplished by the retard switch.

It should be kept in mind that switches may be operated by remote control means in a conventional manner.

Thus, the above-mentioned objectives of the invention are effectively attained.

We claim:

1. A cartridge adapted for connection to an audio-visual projector comprising:
   an outer casing containing therein an endless tape having a sound track and a signal track on a first reel and an endless filmstrip in a loop;
   means on said cartridge to bring said continuous tape and continuous filmstrip into communication with openings in the casing of said cartridge;
   said tape and said filmstrip in said cartridge being in side-by-side relationship with a separating wall therebetween;
   a tape turning member extending inwardly from the side wall of the tape portion of the cartridge and engaging said tape to twist at approximately 90° and facilitate the feeding of and rewinding of the continuous roll of tape;

a film turning member extending inwardly from the side wall of the film compartment of the cartridge and positioned so as to engage and turn said film approximately 90° as it is unwound from said reel so as to facilitate the continuous feeding of the filmstrip; and a recess in the separator wall between the filmstrip compartment and the tape compartment of said cartridge located adjacent to said film turning member to facilitate the freedom of movement of said film as it is turned 90° in its continuous movement.

* * * * *